(12) United States Patent
Geibel et al.

(10) Patent No.: US 9,835,232 B2
(45) Date of Patent: Dec. 5, 2017

(54) TENSIONING RAIL WITH LUBRICANT PASSAGE

(71) Applicant: IWIS MOTORSYSTEME GMBH & CO. KG, Munich (DE)

(72) Inventors: Henning Geibel, Wessling (DE); Renzo Perissinotto, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 71 days.

(21) Appl. No.: 14/877,686

(22) Filed: Oct. 7, 2015

(65) Prior Publication Data

US 2016/0102737 A1    Apr. 14, 2016

(30) Foreign Application Priority Data

Oct. 8, 2014  (DE) .......................... 10 2014 014 905

(51) Int. Cl.
| | |
|---|---|
| F16H 7/08 | (2006.01) |
| F16H 57/04 | (2010.01) |
| F16H 7/06 | (2006.01) |
| F16H 57/05 | (2006.01) |
| F16H 7/18 | (2006.01) |

(52) U.S. Cl.
CPC .............. *F16H 7/08* (2013.01); *F16H 57/05* (2013.01); *F16H 7/06* (2013.01); *F16H 2007/0872* (2013.01); *F16H 2007/0893* (2013.01); *F16H 2007/185* (2013.01)

(58) Field of Classification Search
CPC ... F16H 57/05; F16H 7/06; F16H 7/08; F16H 2007/0872

USPC ..................................................... 474/91, 111
See application file for complete search history.

(56) References Cited

U.S. PATENT DOCUMENTS

| | | | | |
|---|---|---|---|---|
| 5,184,983 A | * | 2/1993 | Shimaya | F16H 7/08 474/111 |
| 5,318,482 A | * | 6/1994 | Sato | F16H 7/08 474/111 |
| 5,647,811 A | * | 7/1997 | Mott | F16H 7/08 184/16 |
| 5,820,502 A | * | 10/1998 | Schulze | F01L 1/024 474/111 |

(Continued)

FOREIGN PATENT DOCUMENTS

| | | |
|---|---|---|
| DE | 102007026939 | 12/1899 |
| DE | 24 31 425 A1 | 1/1976 |

(Continued)

*Primary Examiner* — William E Dondero
*Assistant Examiner* — Mark K Buse
(74) *Attorney, Agent, or Firm* — Baker & Hostetler LLP

(57) ABSTRACT

A tensioning rail for an endless drive means, in particular for a chain drive of an internal combustion engine, comprises a support body and a sliding body arranged on the support body and having a sliding surface for contacting the endless drive means as well as at least one lubricant opening for wetting the sliding surface with lubricant. A press-on area provided on the support body and used for contacting a tensioning device has an inflow opening for the lubricant. A feed passage extending from the inflow opening through the support body and a lubricant passage extending in the longitudinal direction of the support body allow the supply of lubricant to the at least one lubricant opening.

15 Claims, 3 Drawing Sheets

(56) References Cited

U.S. PATENT DOCUMENTS

| | | | | |
|---|---|---|---|---|
| 5,868,638 | A * | 2/1999 | Inoue | F16H 7/0848 |
| | | | | 474/101 |
| 8,696,500 | B2 * | 4/2014 | Hirayama | F16H 7/18 |
| | | | | 184/11.5 |
| 8,900,079 | B2 * | 12/2014 | Mori | F16H 7/18 |
| | | | | 474/111 |
| 2009/0111627 | A1 * | 4/2009 | Geibel | F01L 1/022 |
| | | | | 474/110 |
| 2009/0325748 | A1 * | 12/2009 | Pflug | F16H 7/18 |
| | | | | 474/91 |
| 2012/0040790 | A1 * | 2/2012 | Perissinotto | F16H 7/0836 |
| | | | | 474/110 |
| 2016/0097439 | A1 * | 4/2016 | Geibel | F16H 7/08 |
| | | | | 474/111 |

FOREIGN PATENT DOCUMENTS

| | | |
|---|---|---|
| DE | 43 103 06 A1 | 10/1994 |
| DE | 296 02 917 U1 | 6/1997 |
| DE | 10 2004 058 948 A1 | 6/2006 |
| JP | 2000097042 | 12/1899 |

\* cited by examiner

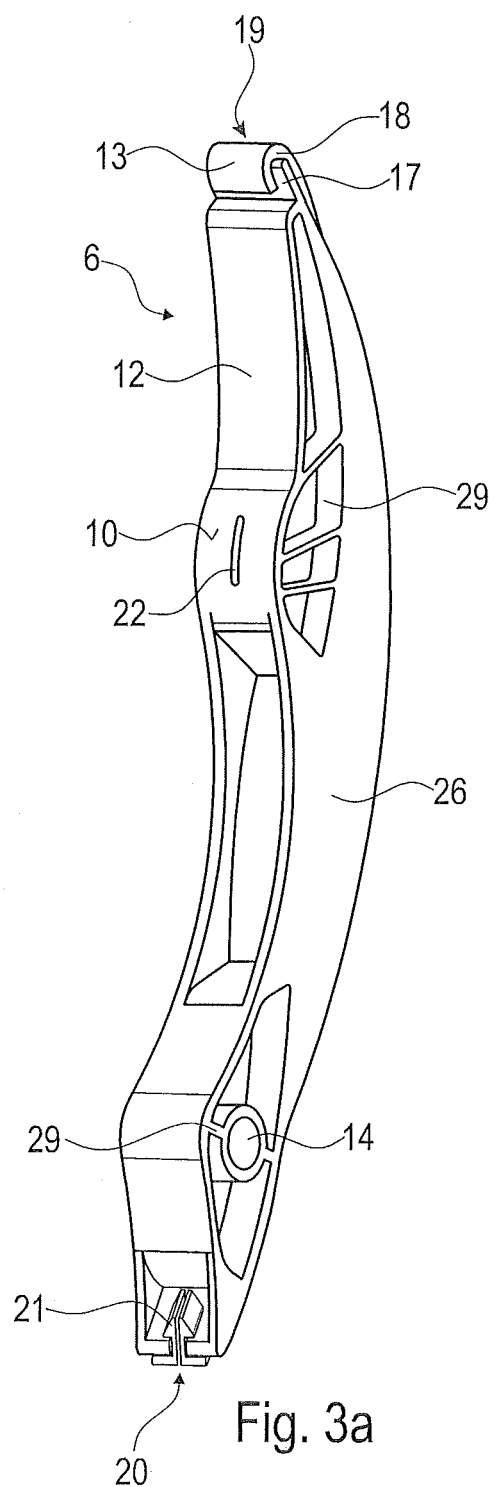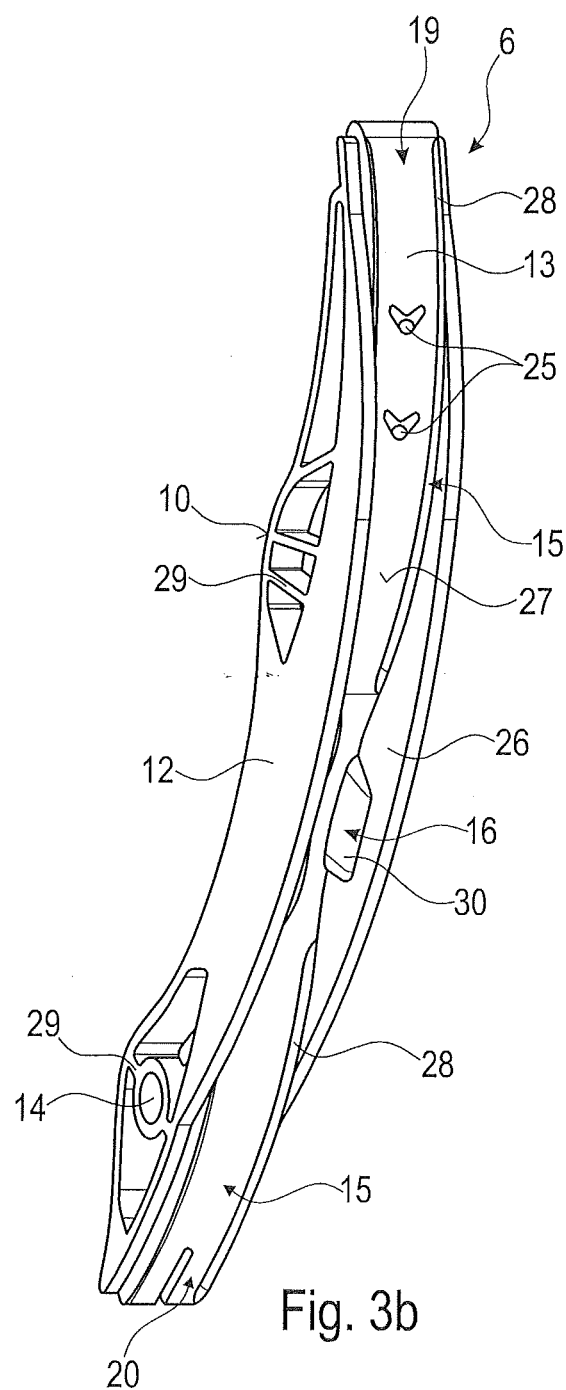

TENSIONING RAIL WITH LUBRICANT PASSAGE

CROSS-REFERENCE TO RELATED APPLICATION

This application claims priority to foreign German patent application No. DE 10 2014 014 905.6, filed on Oct. 8, 2014, the disclosure of which is incorporated by reference in its entirety.

FIELD OF THE INVENTION

The present invention relates to a tensioning rail for an endless drive means, in particular for a chain drive of an internal combustion engine, comprising a support body, a sliding body arranged on said support body and having a sliding surface for contacting the endless drive means as well as at least one lubricant opening for wetting the sliding surface with lubricant, and further comprising a press-on area provided on the support body and used for contacting a tensioning device, wherein an inflow opening for the lubricant, a feed passage extending from the inflow opening through the support body and a lubricant passage extending in the longitudinal direction of the support body and used for supplying the at least one lubricant opening with lubricant are provided. In addition, the present invention relates to a chain drive comprising such a tensioning rail.

BACKGROUND OF THE INVENTION

Tensioning devices comprising a chain tensioner and a tensioning rail are used quite generally where chain drives are used. A preferred field of application is the use in internal combustion engines in which a timing chain drive drives the camshaft by means of a timing chain. In this field of use, high demands have to be satisfied with respect to the strength of the tensioning rail and the sliding and guiding characteristics in the area of contact with the circulating endless drive means, since the endless drive means, which is normally a drive chain, must be kept under a defined tension during operation. In addition, the tensioning device compensates manufacturing tolerances and an elongation of the endless drive means occurring during prolonged use. Conventional tensioning rails consist either completely of a suitable plastic material having a sliding surface for contact with the endless drive means or of a support body provided with a sliding lining. The support body, which may be configured as a metal carrier or as a fiber-reinforced plastic profile, may be provided with a separate low-friction sliding body so as to form the sliding lining in the area of the surface contacting the chain.

DE 24 31 425 A1, by way of example, discloses a tensioning rail whose support has applied thereto a heat-resistant polyamide plastic as a sliding lining. Another tensioning rail comprising a support body made of fiber-reinforced plastics and a low-friction sliding body is disclosed in DE 296 02 917 U1, the support body and the sliding body being produced separately of one another. In the case of a tensioning rail according to DE 43 103 06 A1, however, the sliding body is injection molded onto a support body of fiber-reinforced plastics by means of an injection molding process. Furthermore, reference DE 10 2004 058 948 A1 discloses a tensioning or guide rail in the case of which the sliding surface is wetted with a lubricant via a lubricant passage provided in the tensioning rail. In addition to non-uniform wetting of the sliding surface with the lubricant, a uniform supply of lubricant via respective feed passages is often problematic, especially in the case of tensioning rails.

Although many of the prior art structural designs of tensioning devices comprising tensioning rails for pretensioning endless drive means proved to be very useful, there are often problems and cases of use necessitating an adaptation of the structural design or a change of structure. Moreover, due to the general pressure for innovations in the field of automotive industry, it, is constantly endeavored to improve the components used and to adapt them to increasing demands.

It is therefore the object of the present invention to provide a tensioning rail having an optimized lubricant supply.

SUMMARY OF THE INVENTION

According to the present invention, this object is achieved in that the inflow opening for the lubricant is formed on the press-on area of the support body. Via said inflow opening on the press-on area, the lubricant exiting the associated tensioning device through the vent hole on the end-face side of the tensioning piston can flow directly into the feed passage and from there into the lubricant passage for supplying the at least one lubricant opening. An additional, separate lubricant supply of the tensioning rail is therefore not necessary. Tensioning devices, which, when used for chain drives in internal combustion engines, are normally provided with a hydraulically operated tensioning pistons and which are operated via the engine oil circuit, are often provided with a damping and/or vent hole from which the engine oil exits the tensioning device under pressure. Making use of a tensioning rail according to the present invention, this engine oil flow exiting the tensioning device can be used directly as a lubricant for wetting the sliding surface. The engine oil exiting the tensioning device under pressure flows via the inflow opening and the feed passage, which extends from the inflow opening through the support body, into the lubricant passage extending in the longitudinal direction of the support body and from there to one or a plurality of lubricant openings in the sliding body for thus wetting the sliding surface of the sliding body with lubricant. Preferably, a plurality of lubricant openings provided in the longitudinal direction of the sliding body are supplied via the lubricant passage so as to achieve, by means of a supply of lubricant at various locations to be preferably lubricated, an optimum lubrication of the sliding surface of the tensioning rail and of the endless drive means, respectively. Hence, the tensioning rail according to the present invention allows an optimum supply and distribution of the lubricant on the sliding surface of the sliding body without a separate supply to the tensioning rail and without any additional components.

According to an expedient embodiment, the inflow opening is elongate in shape, the length of the inflow opening amounting preferably to at least three times the width of the inflow opening, in particular five times the width of the inflow opening. An elongate inflow opening oriented in the longitudinal direction of the tensioning rail allows the engine oil exiting the vent hole to be reliably taken in by the inflow opening, even in the case of a varying position of the tensioning piston of the tensioning device on the press-on area of the support body. In addition to the influence of manufacturing tolerances, a change of length of the endless drive means or drive chain occurs also due to wear during prolonged periods of use in the drive, said change of length being compensated for via the tensioning rail pressed against the drive chain by means of the tensioning device. Since the tensioning rail pivots here about a bearing point located remote from the tensioning device, also the position of the tensioning piston of the tensioning device on the press-on area of the tensioning rail will change. The elongate inflow opening can take in, unhindered and independently of the position of the tensioning piston, the engine oil flow exiting the tensioning piston and conduct it directly into the feed passage. Since the inflow opening does not taper in the direction of the feed passage, the engine oil will be injected, at any position, from the vent hole of the tensioning piston directly and without being decelerated via the inflow opening into the feed passage, and will then be fed into the adjoining lubricant passage. Thus, it is achieved that the sliding surface is wetted, via the lubricant openings associated with the lubricant passage, with the engine oil flow exiting the tensioning device. In order to cover the whole pivoting range of the tensioning rail, the length of the inflow opening may amount preferably to at least three times the width of the inflow opening. In the case of tensioning rails covering, with a very large pivoting range, also an extreme elongation of the endless drive means, the length of the inflow opening may preferably also amount to at least five times the width of the inflow opening.

For reducing the amount of component parts of a tensioning rail according to the present invention and for guaranteeing that the lubricant flow can flow unhindered through the inflow opening into the feed passage, the press-on area may be formed by the support body in an integral fashion. An outwardly slightly convex press-on area on the lower surface of the support body facing away from the sliding body can provide a reliable contact with the tensioning device, e.g. a tensioning piston, and is, moreover, easily realizable in the case of the various manufacturing possibilities of the support body.

According to another embodiment, the feed passage widens in a trapezoidal shape from the inflow opening to the lubricant passage. The trapezoidal widening of the feed passage takes into account the exit angle of the engine oil, which varies due to varying positions of the tensioning piston of the tensioning device on the press-on area of the support body, and guarantees thus that the lubricant can flow into the lubricant passage as unhindered as possible. Depending on the respective position of the tensioning piston relative to the press-on area and the tensioning rail, said widening of the feed passage in the direction of the front of the tensioning rail prevents premature impact and deceleration of the injected engine oil on the lateral walls of the feed passage. In addition, the trapezoidal widening of the feed passage facilitates the manufacturing of the feed passage in the support body through undercut-free cores in the injection molding process.

According to an advantageous embodiment, the lubricant passage is formed between the support body and the sliding body. The fact that the lubricant passage is arranged and formed between the support body and the sliding body allows different possibilities of producing the lubricant passage, which are adapted to the respective manufacture of the support body and of the sliding body. According to an advantageous embodiment, the lubricant passage may be configured as a groove in the support body or in the sliding body. A groove open on one side thereof can easily be taken into account in the case of injection molding of plastic materials, founding processes or sintering processes and can also easily be provided by means of a subsequent processing step. Since the groove configured as a lubricant passage is positioned between the support body and the sliding body, a closed lubricant passage is obtained without any additional components being required.

In order to make things easier, the support body may be produced by means of injection molding from a plastic material, preferably from a fiber-reinforced plastic material. The injection molding of support bodies, e.g. from a fiber-reinforced thermosetting plastic, allows, although material costs and weight are kept low, the manufacture of a stable support body that can be produced at a reasonable price, especially when mass-produced. The support body may comprise truss-like stiffening members. Independently of the manufacture and the material of the support body, truss-like stiffening members allow an increase in strength in combination with a lower weight of the support body.

According to a special embodiment, the sliding body comprises a respective convex section in the area of the meshing end and of the exit end of the endless drive means, at least one concave section being provided between the convex sections in the area of the meshing end and of the exit end of the endless drive means. The convex sections in the areas of the meshing end and exit end of the endless drive means allow a smooth transition from and into the non-guided area and reduce thus the generation of noise at the tensioning rail. In addition, the concave section between the convex sections reduces the contact between the endless drive means and the tensioning rail, and, consequently, also the frictional resistance.

Furthermore, the present invention relates to a chain drive, in particular a timing chain drive of an internal combustion engine, comprising a drive sprocket and at least one driven sprocket, a drive chain connecting the drive sprocket and the at least one driven sprocket, a tensioning rail according to one of above embodiments contacting the drive chain, and a tensioning device for pressing the tensioning rail against the drive chain. This kind of chain drive allows reliable wetting of the sliding surface of a sliding body with a lubricant and, consequently, an optimum lubrication and reduction of the frictional resistance between the endless drive means and the tensioning rail, without making use of additional components or of a separate supply of the tensioning rail with a lubricant.

BRIEF DESCRIPTION OF THE DRAWINGS

In the following, an embodiment of the present invention will be explained in more detail making reference to the drawings, in which:

FIG. 3a shows a perspective bottom view of the tensioning rail of FIG. 1 according to the present invention and FIG. 3b shows a perspective top view of the tensioning rail of FIG. 1 according to the present invention.

DETAILED DESCRIPTION

Figure 1:
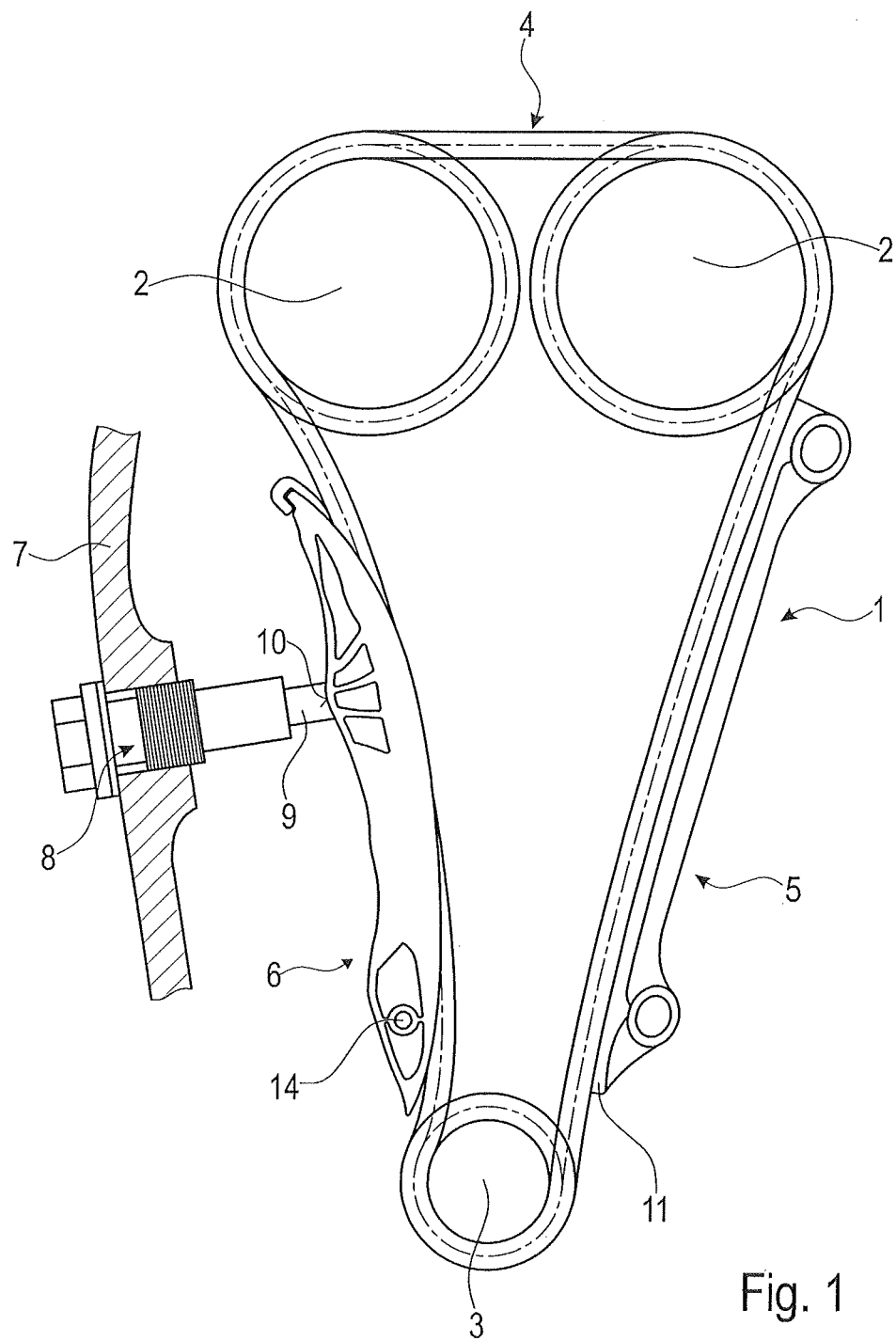
FIG. 1 shows a schematic view of a chain drive according to the present invention.

The drive chain drive 1 of an internal combustion engine schematically shown in FIG. 1 comprises two upper camshaft sprockets 2, a lower crankshaft sprocket 3, an endless drive chain 4 wrapped around said sprockets, a conventional guide rail 5 for guiding the drive chain 4 in the tight span of the drive chain drive 1, and a pivotably arranged tensioning rail 6 pressing against the drive chain 4 in the slack span of the timing chain drive 1. The tensioning rail 6 is pressed against the drive chain 4 by means of a tensioning device 8 arranged in the engine case 7. The tensioning device 8 is configured as a chain tensioner screwed into the engine case 7 and connected to the engine oil hydraulics, so that the tensioning piston 9 of the tensioning device 8 presses against a press-on area 10 of the pivotably arranged tensioning rail 6. The conventionally designed guide rail 5 rests, with the sliding surface of its sliding body 11, against the outer side of the drive chain 4 running therealong.

Figure 2:
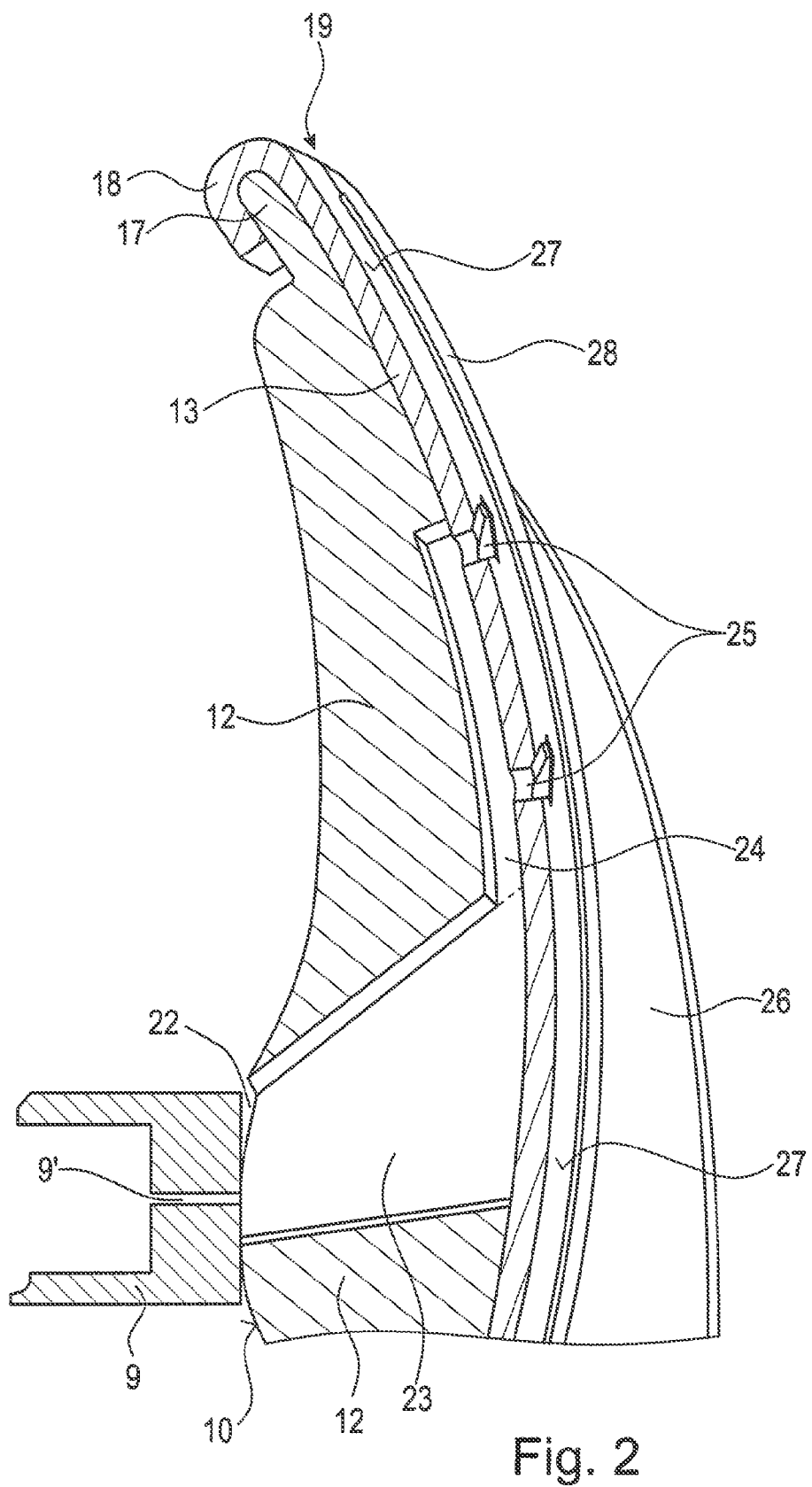
FIG. 2 shows a sectional view through part of the tensioning rail of FIG. 1 according to the present invention.

FIG. 2 shows an enlarged sectional view of a part of the tensioning rail 6 according to FIG. 1. The tensioning rail 6 is bipartite and comprises a central support body 12 and a sliding body 13 extending over the front of the support body 12 facing the drive chain 4. The tensioning rail 6 is here supported such that it is pivotable about the bearing point 14, as can be seen in FIG. 1. At a tensioning end of the tensioning rail 6 facing away from the bearing point 14 and at a meshing end 19 of the drive chain 4, the support body 12 has a protruding nose 17 engaging a pocket 18 of the sliding body 13 so as to fix the sliding body 13 at said tensioning end. The sliding body 13 extends in one piece along the tensioning-side meshing end 19 of the drive chain 4 up to the exit end 20 of the drive chain 4 close to the bearing point 14. In the area of the exit end 20, the sliding body 13 is secured to the support body 12 by means of a locking element 21, cf. also FIGS. 3a and 3b.

On the back of the support body 12 facing away from the sliding body 13, an inflow opening 22 is provided in the area of the press-on area 10, for receiving therein the engine oil exiting the vent hole 9' of the tensioning piston 9. The inflow opening 22 in the press-on area 10 of the support body 12 is followed by the trapezoidal feed passage 23, which widens continuously from the inflow opening 22 in the direction of the lubricant passage 24. Starting from the feed passage 23, the lubricant passage 24 extends below the sliding body 13 in the direction of the tensioning-side meshing end 19 so as to supply the lubricant openings 25 with engine oil. The engine oil exits said lubricant openings 25 and flows onto the sliding surface 27 facing the drive chain 4, said drive chain 4, when in operation, sliding along the sliding body 13 of said sliding surface 27 in a well lubricated condition. The sliding surface 27 has provided thereon lateral sliding-contact guide sections 28 protruding substantially perpendicularly from the sliding surface 27 and defining a lateral guide for the drive chain 4. Beyond the sliding-contact guide sections 28, cheeks 26 are provided as lateral boundaries of the sliding body 13 and of the support body 12, said cheeks 26 being defined by the support body 12 and extending beyond the sliding body in the direction of the drive chain 4 so as to allow said drive chain 4 to be laterally guided and secured throughout the whole length of the tensioning rail.

FIG. 3a shows an enlarged perspective view of the tensioning rail 6 of FIG. 1 according to the present invention, showing the lower surface of the tensioning rail 6 which faces away from the drive chain 4. At the meshing end 19 of the tensioning rail 6, it can be seen that the sliding body 13 is fixed via the sliding body pocket 18 gripping over the nose 17 of the support body 12. At the exit end 20 of the tensioning rail 6, the locking element 21 is provided, which extends from the underside and which engages a complementary opening on the support body 12 so as to fix the sliding body 13. In the area of the bearing point 14 and of the press-on area 10, the support body 12 is provided with window openings, which, by means of truss-like stiffening members 29 and a central partition, simultaneously improve the stability of the support body and reduce the amount of material required. On the other side of the window openings stabilized by said stiffening members 29, the cheeks 26 extend in the direction of the drive chain 4 (not shown). The elongate inflow opening 22, which opens into the feed passage 23, extends along the press-on area 10 on the support body 12, said inflow opening 22 extending, in accordance with the convex shape of the press-on area 10, in an arcuate shape along the press-on area 10 in the longitudinal direction of the tensioning rail 6.

FIG. 3b shows another enlarged perspective top view of the tensioning rail 6 of FIG. 1 according to the present invention, the view shown here being a view of the upper surface of the tensioning rail 6 which faces the drive chain 4. In the area of the press-on area 10 and of the bearing point 14, the stiffening members 29 can again be seen clearly. The sliding body 13 extends, at the meshing end 19 and at the exit end 20, over two chain guide sections 15 projecting in a convex shape and over an intermediate, receding concave section 16, so that the drive chain 4 (not shown) contacts the sliding surface 27 of the sliding body 13 only in the area of the two convex chain guide sections 15 at the meshing end 19 and at the exit end 20. In addition to the fixing of the sliding body 13 through its pocket 18 at the meshing end 19 and the locking element 21 at the exit end 20, the sliding body 13 is fixed in the concave shape in the receding section 16 through two downholders 30 arranged on the cheeks 26 of the support body 12, and is suitably tensioned over the chain guide sections 15. The sliding-contact guide sections 28 protruding from the sliding body 13 in the direction of the drive chain 4 extend only along the chain guide sections 15, whereas they are not provided in the receding section 16 of the sliding body 13 and allow the sliding body 13 to be fixed by the downholders 30. The sliding surface 27 of the sliding body 13 has provided thereon two lubricant openings 25 in the area of the chain guide section 15 at the meshing end 19, said lubricant openings 25 communicating with the inflow opening 22 on the press-on area 10 via the feed passage 23 and the lubricant passage 24. The lubricant openings 25 allow a uniform distribution of the lubricant over the sliding surface 27 of the sliding body 13 in the area of the chain guide section 15 at the meshing end 19 of the tensioning rail 6, this being the area which is subjected to the highest friction load.

For a tensioning rail 6 according to the present invention of the type shown in FIGS. 1, 2, 3a and 3b, the support body 12 and the sliding body 13 are produced by means of separate injection molding processes, the material used for the support body 12 being e.g. a fiber-reinforced thermosetting plastic and the material used for the sliding body 13 being e.g. a plastic material having good sliding characteristics. When the support body 12 is injection molded, the lubricant passage 24 configured as a groove, the trapezoidally shaped feed passage 23 as well as the inflow opening 22 can be formed, in an undercut-free manner, through a suitable core from the upper side of the support body 12, thus allowing the support body 12 to be produced easily and at a reasonable price. Upon producing the sliding body 13, the pocket 18, the locking element 21 as well as the lubricant openings 25 can be taken into account in a similar way. When a separately produced sliding body 13 is mounted on the support body 12, the pocket 18 of the sliding body 13 is first pushed onto the protruding nose 17 of the support body 12, and subsequently the sliding body 13 is fixed at the exit end 20 by means of the locking element 21. Subsequently, the sliding body 13 is pushed-in in the receding section 16 and fixed in position in said receding section 16 via the downholders 30 on the cheeks 26 of the support body 12. This will lead to a wavelike arrangement of the sliding body 13 on the support body 12 and, simultaneously, to a reliable fixing and clamping of the sliding body 13 at the nose 17 and via the locking element 21 at the exit end 20.

LIST OF REFERENCE NUMERALS 1 timing chain drive
2 camshaft sprockets
3 crankshaft sprocket
4 drive chain
5 guide rail
6 tensioning rail
7 engine case
8 tensioning device
9 tensioning piston
9' vent hole
10 press-on area
11 sliding body
12 support body
13 sliding body
14 bearing point
15 chain guide section
16 receding section
17 protruding nose
18 pocket
19 meshing end
20 exit end
21 locking element
22 inflow opening
23 feed passage
24 lubricant passage
25 lubricant openings
26 cheeks
27 sliding surface
28 sliding-contact guide sections
29 stiffening members
30 downholders

The invention claimed is:

1. A tensioning rail for an endless drive means, comprising a support body and a sliding body arranged on said support body, the sliding body having a sliding surface for contacting the endless drive means and at least one lubricant opening for wetting the sliding surface with lubricant, and further comprising a press-on area provided on the support body and used for contacting a tensioning device, wherein an inflow opening for the lubricant, a feed passage extending from the inflow opening through the support body and a lubricant passage extending in the longitudinal direction of the support body and used for supplying the at least one lubricant opening with lubricant are provided, and wherein the inflow opening is formed on the press-on area of the support body, and wherein, in the area of a meshing end and in the area of an exit end of the endless drive means, the sliding body comprises a respective convex section, at least one concave section being provided between the convex sections in the area of the meshing end and in the area of the exit end of the endless drive means.

2. The tensioning rail according to claim 1, wherein the inflow opening is elongate in shape, wherein the length of the inflow opening amounts to at least three times the width of the inflow opening.

3. The tensioning rail according to claim 1, wherein the press-on area is formed by the support body in an integral fashion.

4. The tensioning rail according to claim 1, wherein the feed passage widens in a trapezoidal shape from the inflow opening to the lubricant passage.

5. The tensioning rail according to claim 1, wherein the lubricant passage is formed between the support body and the sliding body.

6. The tensioning rail according to claim 5, wherein the lubricant passage is configured as a groove in the support body or in the sliding body.

7. The tensioning rail according to claim 1, wherein the support body is produced by means of injection molding from a plastic material.

8. The tensioning rail according to claim 7, wherein the support body is made from a fiber-reinforced plastic material.

9. The tensioning rail according to claim 1, wherein the support body comprises truss-like stiffening members.

10. A chain drive of an internal combustion engine, comprising a drive sprocket and at least one driven sprocket, a drive chain connecting the drive sprocket and the at least one driven sprocket, a tensioning rail according to claim 1 contacting the drive chain, and a tensioning device for pressing the tensioning rail against the drive chain.

11. The tensioning rail according to claim 1, wherein the support body and the sliding body are separate parts.

12. The tensioning rail according to claim 1, wherein the support body and the sliding body are produced by separate injection molding processes.

13. The tensioning rail according to claim 1, wherein the sliding body is fixed to the support body via a locking element.

14. The tensioning rail according to claim 1, wherein the sliding body defines a pocket and the support body defines a nose, and wherein the pocket of the sliding body grips over the nose of the support body.

15. The tensioning rail according to claim 1, wherein the inflow opening is elongate in shape.

* * * * *